T. E. BÜSCHMANN.
TABULATOR BAR OF TYPEWRITER TABULATORS.
APPLICATION FILED MAR. 23, 1921.
1,428,140.
Patented Sept. 5, 1922.
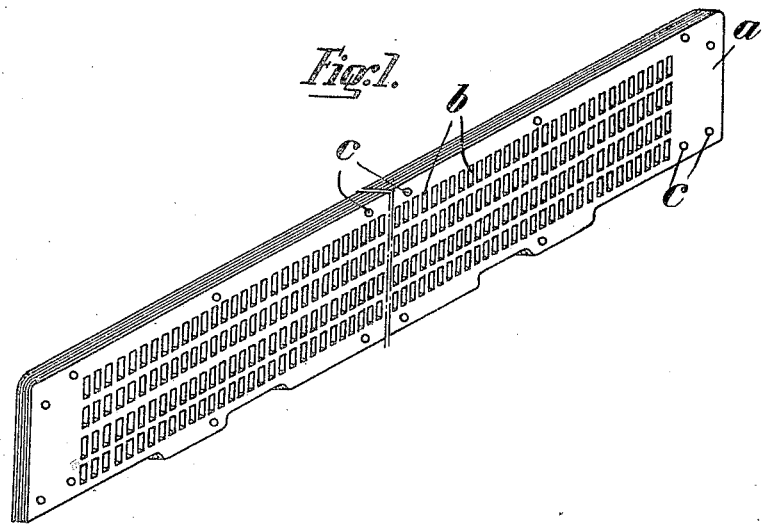
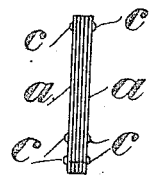
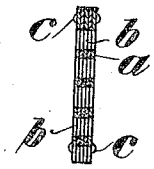
Inventor
T. E. Büschmann,
By Marks & Clerk
Attys.

Patented Sept. 5, 1922.

1,428,140

UNITED STATES PATENT OFFICE.

THEODOR EUGEN BÜSCHMANN, OF CHEMNITZ-KAPPEL, GERMANY, ASSIGNOR TO WANDERER-WERKE VORM. WINKLHOFER & JAENICKE AKTIENGESELLSCHAFT, OF SCHONAU B. CHEMNITZ, GERMANY.

TABULATOR BAR OF TYPEWRITER TABULATORS.

Application filed March 23, 1921. Serial No. 454,943.

(GRANTED UNDER THE PROVISIONS OF THE ACT OF MARCH 3, 1921, 41 STAT. L., 1313.)

*To all whom it may concern:*

Be it known that I, THEODOR EUGEN BÜSCHMANN, a citizen of the realm of Germany, and residing at Haydnstrasse 9, Chemnitz-Kappel, Germany, have invented certain new and useful Improvements in the Tabulator Bars of Typewriter Tabulators (for which I have filed application in Germany July 26, 1918, Patent No. 326,965), of which the following is a specification.

The tabulator bars usually employed in the tabulators of typewriters, serving for the engagement of the tabulator stops, are usually provided with their slots into which the said stops are adapted to be engaged, by milling or similar operations which have the drawback that they render the machining of the tabulator bar costly and tedious. Those tabulator bars are also usually made rather weak, so that there is the risk of their bending laterally or downwardly. These drawbacks are particularly apparent when a number of tabulator bars are employed in a known manner side by side in a tabulator.

The present invention avoids the drawbacks of the hitherto used tabulator bars by composing such bars of a number of comparatively thin sheet metal plates or strips, in which the slots for the tabulator stops are formed by punching. The sheet metal strips or sheet metal plates are placed one upon another in such a manner that the punched slots come exactly over one another, and the strips are then assembled together so as to form a rigid whole by rivets or bolts passed through them.

The machining of the several sheet metal plates by punching takes place with extreme rapidity and with perfect regularity. The number of rows of slots arranged side by side has practically no effect upon the time taken in machining, so that the maufacture of a tabulator bar with four rows of slots, which has been hitherto produced by assembling together four separately machined tabulator bars, does not take any more time than the machining of one bar having two rows or only one row of slots. Further, owing to the composite structure of the improved tabulator bar, the latter affords much greater security against bending or deflection than the tabulator bars hitherto employed made of a number of tabulator bars assembled together, so that special stiffening devices may be dispensed with.

A constructional form of this invention is illustrated by way of example in the accompanying drawings in which:—

Figure 1 is a perspective view of the improved tabulator bar.

Figure 2 is an end view, and

Figure 3 is a cross section thereof.

As shown, the improved tabulator bar is composed of a number (five are shown) of superposed sheet metal plates or strips $a$ provided with one or more rows of slots $b$ formed by suitable punching apparatus. The several sheet metal strips are placed upon or against one another in such a manner that their slots $b$ come exactly over one another as shown in Figure 3. In this position the strips are then fastened together by means of rivets or bolts $c$ extending through the said strips so as to constitute a rigid whole having the thickness of the hitherto usual tabulator bars. By using a large number of rivets as shown in Figure 1, the improved tabulator bar can be made so stiff as to exclude all risk of bending or deflection.

Having now described my invention what I claim as new and desire to secure by Letters Patent is:—

An improved tabulator bar for the tabulator of a typewriter, characterized by the feature that the improved bar is composed of a number of metal strips placed over or against one another and fastened rigidly together by means of screws or rivets, said strips being formed with accurately superposed slots for the engagement of the tabulator stops.

In testimony whereof I have signed my name to this specification.

THEODOR EUGEN BÜSCHMANN.

Witnesses:
  OSCAR HOFMANN,
  GEORG GABLER.